United States Patent
Esvelt et al.

(10) Patent No.: US 9,906,175 B2
(45) Date of Patent: Feb. 27, 2018

(54) METHOD OF STARTING A THREE-PHASE BLDC MOTOR AND MOTOR DRIVER USING SAME

(71) Applicant: Melexis Technologies NV, Tessenderlo (BE)

(72) Inventors: Michaël Bernardus Petrus Esvelt, Arnhem (NL); Robert Filusch, Erfurt (DE)

(73) Assignee: MELEXIS TECHNOLOGIES NV, Tessenderlo (BE)

( * ) Notice: Subject to any disclaimer, the term of this patent is extended or adjusted under 35 U.S.C. 154(b) by 0 days.

(21) Appl. No.: 15/276,887

(22) Filed: Sep. 27, 2016

(65) Prior Publication Data
US 2017/0093314 A1    Mar. 30, 2017

(30) Foreign Application Priority Data
Sep. 28, 2015 (GB) .................................. 1517124

(51) Int. Cl.
*H02P 1/54* (2006.01)
*H02P 6/20* (2016.01)
*H02P 27/08* (2006.01)

(52) U.S. Cl.
CPC ............... *H02P 6/20* (2013.01); *H02P 27/08* (2013.01)

(58) Field of Classification Search
CPC .. H02P 6/157; H02P 6/182; H02P 6/00; H02P 2209/11; H02P 6/20; H02P 8/04; H02P 21/34
USPC .......... 318/101, 753, 755, 778, 459, 400.34, 318/298, 400.32
See application file for complete search history.

(56) References Cited

U.S. PATENT DOCUMENTS

| 2006/0186846 | A1 | 8/2006 | Lassen | |
|---|---|---|---|---|
| 2006/0284581 | A1 | 12/2006 | Mulliin et al. | |
| 2007/0194731 | A1* | 8/2007 | Fukamizu | H02P 6/182 318/400.09 |
| 2009/0174355 | A1* | 7/2009 | Su | H02P 6/182 318/400.33 |

(Continued)

OTHER PUBLICATIONS

European Search Report from EP Application No. 16189107.2, dated Mar. 21, 2017.

(Continued)

*Primary Examiner* — Bickey Dhakal
(74) *Attorney, Agent, or Firm* — Justin Cassell; Workman Nydegger

(57) ABSTRACT

Method of starting a three-phase sinusoidal BLDC motor, comprising: a) determining an initial position of the rotor; b) applying a first set of sinusoidal energizing signals to the windings, corresponding to a set of sinusoidal waveforms shifted apart by 120° and 240° sampled at a first angle ($\Phi 1$); and maintaining the energizing signals for allowing the rotor to move to a first angular position; c) while maintaining the energizing signals, monitoring two of the phase currents, and determining whether a predefined condition is satisfied, comprising testing whether a ratio of two total current values is equal to a predefined value, and if true, to repeat steps b) and c), but with second and further sinusoidal energizing signals sampled at a second or further angular position, selected from a limited group of discrete angular positions.

20 Claims, 9 Drawing Sheets

(56) References Cited

U.S. PATENT DOCUMENTS

| 2009/0179603 | A1* | 7/2009 | Chen | H02P 6/182 |
|---|---|---|---|---|
| | | | | 318/400.33 |
| 2010/0141192 | A1 | 6/2010 | Paintz et al. | |
| 2011/0074327 | A1 | 3/2011 | Paintz et al. | |
| 2012/0293101 | A1 | 11/2012 | Ekler | |

OTHER PUBLICATIONS

Agrawal et al., Steady-State Analysis and Comparison of Control Strategies for PMSM, Hindawi Publishing Corporation, Modelling and Simulation in Engineering, vol. 2015, Article ID 306787, Sep. 20, 2015, 12 Pages.

Lee et al., "A Comparison Study of the Commutation Methods for the Three-Phase Permanent Magnet Brushless DC Motor", 2013, 7 Pages.

Green et al., "Derivation of Motor Line-Current Waveforms from the DC-Link Current of an Inverter", IEE Proceedings, vol. 136, Pt. B, No. 4, Jul. 1989, pp. 196-204.

Great Britain Search Report from GB Application No. GB1517124.2, dated Mar. 3, 2016.

* cited by examiner

| x (degr) | x (rad) | U sin(x) | V sin(x-120°) | W sinx(x-240°) | U/V | U/W | V/W | V/U | W/U | W/V |
|---|---|---|---|---|---|---|---|---|---|---|
| 0 | 0,000 | 0,000 | -0,866 | 0,866 | 0,000 | 0,000 | -1,000 | --- | --- | -1,000 |
| 1 | 0,017 | 0,017 | -0,875 | 0,857 | -0,020 | 0,020 | -1,020 | -5,000 | 5,000 | -0,980 |
| 10 | 0,175 | 0,174 | -0,940 | 0,766 | -0,185 | 0,227 | -1,227 | -5,000 | 4,411 | -0,815 |
| 11 | 0,192 | 0,191 | -0,946 | 0,755 | -0,202 | 0,253 | -1,253 | -4,955 | 3,955 | -0,798 |
| 12 | 0,209 | 0,208 | -0,951 | 0,743 | -0,219 | 0,280 | -1,280 | -4,574 | 3,574 | -0,781 |
| 13 | 0,227 | 0,225 | -0,956 | 0,731 | -0,235 | 0,308 | -1,308 | -4,251 | 3,251 | -0,765 |
| 14 | 0,244 | 0,242 | -0,961 | 0,719 | -0,252 | 0,336 | -1,336 | -3,973 | 2,973 | -0,748 |
| 15 | 0,262 | 0,259 | -0,966 | 0,707 | -0,268 | 0,366 | -1,366 | -3,732 | 2,732 | -0,732 |
| 18 | 0,314 | 0,309 | -0,978 | 0,669 | -0,316 | 0,462 | -1,462 | -3,165 | 2,165 | -0,684 |
| 19 | 0,332 | 0,326 | -0,982 | 0,656 | -0,332 | 0,496 | -1,496 | -3,015 | 2,015 | -0,668 |
| 20 | 0,349 | 0,342 | -0,985 | 0,643 | -0,347 | 0,532 | -1,532 | -2,879 | 1,879 | -0,653 |
| 29 | 0,506 | 0,485 | -1,000 | 0,515 | -0,485 | 0,941 | -1,941 | -2,062 | 1,062 | -0,515 |
| 30 | 0,524 | 0,500 | -1,000 | 0,500 | -0,500 | 1,000 | -2,000 | -2,000 | 1,000 | -0,500 |
| 31 | 0,541 | 0,515 | -1,000 | 0,485 | -0,515 | 1,062 | -2,062 | -1,941 | 0,941 | -0,485 |
| 40 | 0,698 | 0,643 | -0,985 | 0,342 | -0,653 | 1,879 | -2,879 | -1,532 | 0,532 | -0,347 |
| 41 | 0,716 | 0,656 | -0,982 | 0,326 | -0,668 | 2,015 | -3,015 | -1,496 | 0,496 | -0,332 |
| 42 | 0,733 | 0,669 | -0,978 | 0,309 | -0,684 | 2,165 | -3,165 | -1,462 | 0,462 | -0,316 |
| 45 | 0,785 | 0,707 | -0,966 | 0,259 | -0,732 | 2,732 | -3,732 | -1,366 | 0,366 | -0,268 |
| 46 | 0,803 | 0,719 | -0,961 | 0,242 | -0,748 | 2,973 | -3,973 | -1,336 | 0,336 | -0,252 |
| 47 | 0,820 | 0,731 | -0,956 | 0,225 | -0,765 | 3,251 | -4,251 | -1,308 | 0,308 | -0,235 |
| 48 | 0,838 | 0,743 | -0,951 | 0,208 | -0,781 | 3,574 | -4,574 | -1,280 | 0,280 | -0,219 |
| 49 | 0,855 | 0,755 | -0,946 | 0,191 | -0,798 | 3,955 | -4,955 | -1,253 | 0,253 | -0,202 |
| 50 | 0,873 | 0,766 | -0,940 | 0,174 | -0,815 | 4,411 | --- | -1,227 | 0,227 | -0,185 |
| 59 | 1,030 | 0,857 | -0,875 | 0,017 | -0,980 | --- | --- | -1,020 | 0,020 | -0,020 |
| 60 | 1,047 | 0,866 | -0,866 | 0,000 | -1,000 | --- | --- | -1,000 | 0,000 | 0,000 |
| 61 | 1,065 | 0,875 | -0,857 | -0,017 | -1,020 | --- | --- | -0,980 | -0,020 | 0,020 |
| 70 | 1,222 | 0,940 | -0,766 | -0,174 | -1,227 | --- | 4,411 | -0,815 | -0,185 | 0,227 |
| 71 | 1,239 | 0,946 | -0,755 | -0,191 | -1,253 | -4,955 | 3,955 | -0,798 | -0,202 | 0,253 |
| 72 | 1,257 | 0,951 | -0,743 | -0,208 | -1,280 | -4,574 | 3,574 | -0,781 | -0,219 | 0,280 |
| 73 | 1,274 | 0,956 | -0,731 | -0,225 | -1,308 | -4,251 | 3,251 | -0,765 | -0,235 | 0,308 |
| 74 | 1,292 | 0,961 | -0,719 | -0,242 | -1,336 | -3,973 | 2,973 | -0,748 | -0,252 | 0,336 |
| 75 | 1,309 | 0,966 | -0,707 | -0,259 | -1,366 | -3,732 | 2,732 | -0,732 | -0,268 | 0,366 |
| 78 | 1,361 | 0,978 | -0,669 | -0,309 | -1,462 | -3,165 | 2,165 | -0,684 | -0,316 | 0,462 |
| 79 | 1,379 | 0,982 | -0,656 | -0,326 | -1,496 | -3,015 | 2,015 | -0,668 | -0,332 | 0,496 |
| 80 | 1,396 | 0,985 | -0,643 | -0,342 | -1,532 | -2,879 | 1,879 | -0,653 | -0,347 | 0,532 |
| 89 | 1,553 | 1,000 | -0,515 | -0,485 | -1,941 | -2,062 | 1,062 | -0,515 | -0,485 | 0,941 |
| 90 | 1,571 | 1,000 | -0,500 | -0,500 | -2,000 | -2,000 | 1,000 | -0,500 | -0,500 | 1,000 |

FIG. 11

METHOD OF STARTING A THREE-PHASE BLDC MOTOR AND MOTOR DRIVER USING SAME

FIELD OF THE INVENTION

The present invention relates to the general field of brushless DC-motors (BLDC). More specifically the present invention relates to a method of starting a three-phase BLDC motor, and to a motor driver using same.

BACKGROUND OF THE INVENTION

Sensor-less Brushless DC motors and methods for driving such motors, are known in the art. The reader not familiar with BLDC motors may refer to "A COMPARISON STUDY OF THE COMMUTATION METHODS FOR THE THREE-PHASE PERMANENT MAGNET BRUSHLESS DC MOTOR" by Shiyoung Lee, Ph.D., Pennsylvania State University Berks Campus, for a basic introduction of three widely used different commutation methods: trapezoidal (sixstep), sinusoidal and Field Oriented Control (FOC). Table 2 and FIG. 12 of this document show the major advantages & disadvantages of these algorithms. In short, Trapezoidal: low complexity, significant torque ripple; Sinusoidal: medium complexity, Low torque ripple; FOC: high complexity, Low torque ripple. The present invention focuses on sinusoidal motors.

In three-phase trapezoidal motor control, typically two phase windings are energized, and one phase winding is left open. As is very well known in the art, the open winding is typically used to measure the back-electromotive force (BEMF) voltage generated in the windings, when the motor is running. This voltage can be used to determine suitable moments for commutation. This principle is not applicable to sinusoidal control, because no phase winding is left open. Several techniques have been proposed in the art to determine suitable commutation points for sinusoidal motor control.

For example, in one of the prior art techniques, one of the windings is temporarily opened for a short while, sufficiently long for the BEMF to be measured, and is then closed again, for further applying a sinusoidal driving signal. The moment of opening the winding is preferably chosen close to a zero-crossing of the current, in order to keep the effects of the disturbance as small as possible. A problem with techniques based on BEMF is that they are not very reliable for starting the motor, because at startup the motor speed is very small.

There is always room for alternatives and improvements.

SUMMARY OF THE INVENTION

It is an object of embodiments of the present invention to provide a good method of starting a BLDC motor, and a good motor driver using same.

It is an object of particular embodiments of the present invention to provide a method and a motor driver for starting a three-phase BLDC motor with a low algorithmic complexity.

It is an object of particular embodiments of the present invention to provide a method and a motor driver for starting a three phase BLDC motor which can be implemented on simple hardware, such as e.g. a simple microcontroller, or a hybrid chip comprising a simple microcontroller.

It is an object of particular embodiments of the present invention to provide a method and a motor driver for starting a three phase BLDC motor with low noise.

These objectives are accomplished by a method and device according to embodiments of the present invention.

In a first aspect, the present invention provides a method of starting a three-phase BLDC motor comprising a stator with three phase windings and a rotor with a permanent magnet, and current sensing means adapted for measuring a phase current in at least two of the windings, the method comprising: a) determining an initial angular position of the rotor magnet; b) applying a first set of sinusoidal energizing signals to the phase windings for causing first stator currents to flow in the windings thereby generating a first magnetic field oriented in a first direction different from the initial direction of the magnetic field of the rotor magnet, the first set of energizing signals corresponding to a set of values of three sinusoidal waveforms shifted apart by 120° and 240° and sampled at a first angle; and maintaining the first set of energizing signals for allowing the rotor to move to a first angular position different from the initial angular position, the rotor movement causing BEMF voltages to be induced and corresponding rotor currents to flow in the windings; c) while maintaining the first set of sinusoidal energizing signals, monitoring two of the motor phase currents flowing through two of the phase windings using the current sensing means, and determining whether a predefined condition is satisfied, the predefined condition comprising testing whether a ratio of said two total current values is substantially equal to a predefined value, and if the outcome of the test is true, to apply a commutation by repeating steps b) and c) at least once, but instead of applying the first set of sinusoidal energizing signals, applying a second respectively further set of sinusoidal energizing signals different from the set of sinusoidal energizing signals applied in the previous iteration, to thereby move the rotor to a second respectively further angular position; wherein the first, second and further angles are selected from a limited group of discrete angular positions.

The motor may be a sensorless motor.

In some (but not all) embodiments, the predetermined value to be compared with the current ratio, may depend on the value of the sinusoidal energizing signals, and may thus be different in each iteration.

It is an advantage of embodiments of the present invention that it allows a closed loop control (by measuring the current flowing through the windings), as opposed to embodiments where an open-loop control is used (without feedback signal).

It is an advantage that motor stall can be detected very soon (already after the first commutation).

It is a major advantage of the embodiments of the present invention that it provides a motor start-up with low acoustic noise, or reduced noise (e.g. as compared to an open-loop control, which commutes but not necessarily at the most suitable moment), inter alia because it energizes all three windings (instead of only two), and because it does not have to open any of the windings (creating additional transients and thus torque ripple and thus acoustic noise) for measuring BEMF voltage to see if the rotor is turning.

It is a major advantage of embodiments of the present invention that the "step-size" can be chosen depending on the type of motor and/or on the actual speed of the motor and/or on the processing power of the controller. For example, if the motor speed is relatively low (e.g. shortly after start-up), the step-size could be chosen relatively small (e.g. corresponding to energizing samples at 0°, 11°, 19°, 30°, etc.), and when the motor obtains higher speed, the step-size may be increased (thus skipping particular samples), or only specific angles may be used (e.g. only multiples of 30° such that the ratio-values to be compared with is only +1 or −1, or for example only angles at which the current-ratio values are +/−(1/N) or +/−(N/1) with N=2 or 3 or 4).

Stated differently, it is a major advantage that the algorithm is easily scalable. For example, in the simplest implementation using a micro-controller having a relatively small memory size and relatively low processing power, the algorithm may only use steps of 60° and multiples thereof. In a slightly more advanced implementation, the algorithm may only use steps of 30° and multiples thereof. And in a more advanced implementation with a larger memory size and/or more processing power, the algorithm may use a larger set of "interesting" energizing signals, which are not necessarily equidistant.

It is a major advantage of all embodiments of the present invention that no vector calculations are needed, but only very simple scalar calculations. This is made possible inter alia because the algorithm is based on setting specific sets of energizing signals, and "simply waits" until a predefined condition corresponding to that particular set is satisfied.

These advantages work synergistically in that they provide a low-noise, reliable and low-complexity solution, which are all desirable features for motor start-up.

Although the invention is mainly intended to be used for low-acoustic-noise startup of low-ohmic, low-inductance BLDC motors for HVAC and fan applications, the method can also be used for other kinds of application.

In an embodiment, step c) further comprises one or more of the following: (i) monitoring the currents during a predefined time window; (ii) determining whether the monitored currents are increasing or decreasing with time; (iii) taking into account that one of the monitored currents is larger than the other monitored current.

The size and position of the time window of (i) may depend on the actual motor speed. Using one or more additional criteria may be used to exclude invalid detections.

In an embodiment, the limited group of discrete angular positions is the group consisting of the angles for which at least two of the stator energizing signals are equal in sign and magnitude, causing the corresponding stator currents in said stator windings to be also equal in sign and magnitude; and wherein step c) comprises monitoring the total currents in said two stator windings, and testing whether the value of these two currents are equal in sign and magnitude.

In the example of FIG. 11, this group is the group consisting of (30°, 90°, 150°, 210°, 270°, 330°).

It is an advantage of this embodiment that the moment of commutation can be determined by a simple comparison of whether the two measured total currents are the same (in amplitude), which may be implemented for example using a comparator.

It is noted that, instead of finding the moment at which the currents of two windings are equal, it is also possible to find the moment in time at which the third current reaches a local minimum or maximum.

In an embodiment, the limited group of discrete angular positions is the group consisting of the angles for which at least two of the stator energizing signals have a ratio in the group consisting of (+1, −1), causing the corresponding stator currents in said stator windings to have the same ratio; and wherein step c) comprises monitoring the total currents in said two stator windings, and testing whether the value of these two currents have the same ratio.

In the example of FIG. 11, this group is the group consisting of (0°, 30°, 60°, 90°, 120°, 150°, 180°, 210°, 240°, 270°, 300°, 330°).

It is an advantage of this embodiment that the moment of commutation can be determined by extremely simple arithmetic and a comparison.

In an embodiment, the limited group of discrete angular positions is the group consisting of the angles for which at least two of the stator energizing signals have a ratio in the group consisting of (+2, −2, +1, −1, +1/2, −1/2), causing the corresponding stator currents in said stator windings to have the same ratio; and wherein step c) comprises monitoring the total currents in said two stator windings, and testing whether the value of these two currents have the same ratio.

It is an advantage of this embodiment that the moment of commutation can be determined by extremely simple arithmetic and a comparison.

Indeed, testing whether a first digital value v1 is substantially equal to half of a second digital value v2, can be implemented for example by doubling v2 (mere shift operation) to yield a value v3, and by comparing v2 and v3, for example by testing whether abs(v2−v3) is smaller than a predefined threshold value.

In an embodiment, the limited group of discrete angular positions is the group consisting of the angles for which at least two of the stator energizing signals have a ratio in the group consisting of (+4, −4, +3, −3, +2, −2, +1, −1, +1/2, −1/2, +1/3, −1/3, +1/4, −1/4), or a subset thereof, causing the corresponding stator currents in said stator windings to have the same ratio; and wherein step c) comprises monitoring the total currents in said two stator windings, and testing whether the value of these two currents have the same ratio.

In the example of FIG. 11, this is the group consisting of (0°, 11°, 14°, 19°, 30°, 41°, 46°, 49°, 60°, 71°, 74°, 79°, 90°, 101°, 106°, 109°, 120°, 131°, 134°, 139°, 150°, 161°, 166°, 169°, 180°, 191°, 194°, 199°, 210°, 221°, 226°, 229°, 240°, 251°, 254°, 259°, 270°, 281°, 286°, 289°, 300°, 311°, 314°, 319°, 330°, 341°, 346°, 349°) or a subset hereof.

It is an advantage of this embodiment that the moment of commutation can be determined by extremely simple arithmetic and a comparison.

Indeed, testing whether a first digital value v1 is substantially equal to half of a second digital value v2, can be implemented for example by doubling v2 (mere shift operation) to yield a value v3, and by comparing v2 and v3, for example by testing whether abs(v2−v3) is smaller than a predefined threshold value.

Indeed, testing whether a first digital value v1 is substantially equal to 1/3th of a second digital value v2, can be implemented for example by multiplying v2 by 3 (simple shift and add operation) to yield a value v3, and by comparing v1 and v3, for example by testing whether abs(v1−v3) is smaller than a predefined threshold value.

Testing whether the other ratios are substantially equal to the cited predefined numbers can likewise be implemented very easily by very simple arithmetic (for example divide by 2=shift right by 1 bit, divide by 4=shift right by 2 bits, multiply by 3=shift left by 1 bit+addition, multiply by 5=shift left by 2 bits+addition, etc.)

It is an advantage that, although these angular positions are not equidistant, they allow for simple arithmetic calculations.

It is an advantage of embodiments of the present invention, that not all these angular positions need to be used, but an implementation can use any suitable subset hereof, for example only those angles for which a shift operation is required to perform the test.

In some embodiments, the subset may be defined at design-time. In other embodiments, the most suitable subsequent energizing signal may be dynamically chosen, taking into account the current position and the speed of the motor.

It is an advantage of embodiments of a method wherein one or more angular positions are "skipped", depending on the actual speed of the motor.

In an embodiment, the limited group of discrete angular positions is the group consisting of the angles for which at least two of the stator energizing signals have a ratio in the group consisting of (+4, −4, +3, −3, +2, −2, +1/2, −1/2, +1/3, −1/3, +1/4, −1/4), but none of the signals have a ratio of +1 or −1, or a subset thereof, causing the corresponding stator currents in said stator windings to have the same ratio; and wherein step c) comprises monitoring the total currents in said two stator windings, and testing whether the value of these two currents have the same ratio.

In the example of FIG. 11, this is the group consisting of (11°, 14°, 19°, 41°, 46°, 49°, 71°, 74°, 79°, 101°, 106°, 109°, 131°, 134°, 139°, 161°, 166°, 191°, 194°, 199°, 221°, 226°, 229°, 251°, 254°, 259°, 281°, 286°, 289°, 311°, 314°, 319°, 341°, 346°, 349°) or a subset hereof (excluding 0°, 30°, 60°, 90°, etc).

In this embodiment the ratio +1 and −1 is deliberately excluded. As can be seen, there are still plenty of angles that can be used to rotate the motor based on a comparison of two rotor currents.

In another embodiment, the limited group of discrete angular positions is the group consisting of the angles for which at least two of the stator energizing signals have a ratio in the group consisting of (+4, −4, +3, −3, +2, −2, −1, +1/2, −1/2, +1/3, −1/3, +1/4, −1/4), but not signals have a ratio of +1, or a subset of this group, causing the corresponding stator currents in said stator windings to have the same ratio; and wherein step c) comprises monitoring the total currents in said two stator windings, and testing whether the value of these two currents have the same ratio.

In an embodiment, step a) comprises: applying an initial set of energizing signals to the phase windings for causing an initial set of stator currents to flow in the windings, thereby generating a magnetic field oriented in a predefined initial direction, the initial set of energizing signals corresponding to a set of values of three sinusoidal waveforms shifted apart by 120° and 240° sampled at an initial angle; and maintaining the initial set of energizing signals for at least a predefined time period.

In an embodiment, step a) comprises: determining an angular position of the rotor magnet based on the application of a series of pulses to the windings.

The step of determining an angular position of the rotor using pulses per se, is known in the art.

In an embodiment, step b) further comprises, before applying the first predefined set of sinusoidal energizing signals: applying at least one intermediate set of sinusoidal energizing signals to the phase windings, corresponding to a set of values of three sinusoidal waveforms shifted apart by 120° and 240° sampled at an intermediate angle between the initial angle and the first angle, and maintaining the intermediate set of energizing signals for a predefined time.

The main advantage of applying intermediate steps is that it provides lower noise due to lower current ripple and lower torque ripple.

It is specifically pointed out that these intermediate sets of sinusoidal energizing signals may be imposed in an open-loop manner, hence, they need not be selected from the limited set mentioned above, but they may.

In an embodiment, step c) further comprises using a time-out window when monitoring whether the predefined condition is satisfied, and if the predefined condition is not satisfied within the time-out window, to decide that the motor has stalled, and to stop energizing the motor.

Alternatively, instead of stopping the algorithm, one or more retries could be performed, for example, depending on the application, the method may try if the motor can still move in the opposite direction. (it is noted that this is not allowed in all applications, but it is typically allowed for a blower or fan in a HVAC applications).

In a second aspect, the present invention provides a method of driving a three-phase BLDC motor according to a predefined speed profile, the BLDC motor comprising a stator with three phase windings and a rotor with a permanent magnet, and current sensing means adapted for measuring a phase current in each of the windings, the method comprising: starting and accelerating the motor using a method according to the first aspect, and wherein the method further comprises a step d) of measuring an angular speed of the rotor; and if the measured angular speed is higher than a predetermined value, to use a second algorithm to drive the motor according to the predefined speed profile.

Measuring the angular speed can be performed in any known way, and can for example be based on measuring the time between two or more commutations and taking into account the angular distance traveled by the rotor during that time.

Optionally, the method may use a time-out window towards switching to the second algorithm, for example based on the time lapsed, or based on the number of commutation steps already performed since startup.

In an embodiment, the second algorithm is based on measuring a BEMF at zero crossings of the current.

In a third aspect, the present invention provides a motor driver for performing a method according to the first or second aspect, the motor driver comprising: energizing means for energizing the windings of the motor; current sensing means for measuring a current in each of the phase windings; a controller having six outputs for energizing the three phase windings, and having at least two inputs connected to the current sensing means for measuring a current flowing through each of the windings; the controller being adapted for performing a method according to the first aspect or second aspect.

The energizing signals may for example be three voltages generated by three DACs, or may be PWM-signals generated by six PWM blocks or may be emulated in software by setting a general purpose input/output pin high or low.

The controller may for example be a programmable microcontroller, or a programmable hardware device, or a hardcoded state machine in an ASIC, etc.

In an embodiment, the energizing means comprise three bridge circuits, each containing a high-side transistor and a low-side transistor connected in series, and wherein the controller further comprises: at least one analog-to-digital converter for measuring and digitizing at least one signal coming from the current sensing means; means for generating six PWM waveforms to the three bridge circuits.

Preferably the microcontroller contains six PWM hardware blocks, with a configurable duty-cycle setting, because it requires only very little processing power.

In an embodiment, the current sensing means comprises two Hall elements or three Hall elements or two shunt resistors or three shunt resistors, each being arranged for measuring a current in a single phase winding, and being connected to the microcontroller for allowing readout thereof.

In an embodiment, the current sensing means consists of a single shunt resistor arranged in series with the high-side transistors of the bridge circuits, the shunt resistor having two ends, each end being connected to an input of the microcontroller.

The microcontroller may be adapted for applying PWM signals in such a way that, during a first fraction of each PWM period, only one of the PWM signals of the high-side transistors is active, and during a second fraction of each PWM period, only a second one of the PWM signals of the high-side transistors is active, allowing the current through the corresponding windings to be determined with a single shunt resistor.

It is an advantage of using PWM signals having an active period not overlapping in time with the other PWM signals, because it allows the currents of several phase windings to be measured (albeit at slightly different moments in time) using only a single shunt resistor.

In an embodiment, the current sensing means consists of a single shunt resistor arranged in series with the low-side transistors of the bridge circuits, the shunt resistor having two ends, each end being connected to an input of the microcontroller.

In an embodiment, the current sensing means consists of two shunt resistors, an upper shunt resistor arranged in series with the high-side transistors of the bridge circuits, and a lower shunt resistor arranged in series with the low-side transistors of the bridge circuits.

In an embodiment, the motor driver further comprises timing means; and the motor driver is further adapted for calculating an angular speed of the motor using said timing means.

The means can for example include an RC clock and a counter. Using such means, the motor driver can for example determine the time between two (or more) commutations, and derive therefrom an angular speed of the motor, by dividing the angular distance over the time required to travel over said distance.

In a fourth aspect, the present invention provides a computer program product, adapted for performing a method according to the first or second aspect, when being executed by a programmable microcontroller as the controller of the motor driver according to the third aspect.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 2 (top) illustrates the so called "stator-currents". FIG. 2 (bottom) illustrates the so called "rotor currents", which typically have an amplitude much smaller than the "stator currents", especially at low angular velocity.

FIG. 11 is a table with values indicating an angular position in degrees and radians (column 1-2), approximate values of samples of sinusoidal sine functions taken at those angular positions (column 3-5), and ratios of two of these values (column 6-11). Some "interesting" angles and ratios are indicated by black boxes, for explaining the principles of the present invention.

Figure 1:
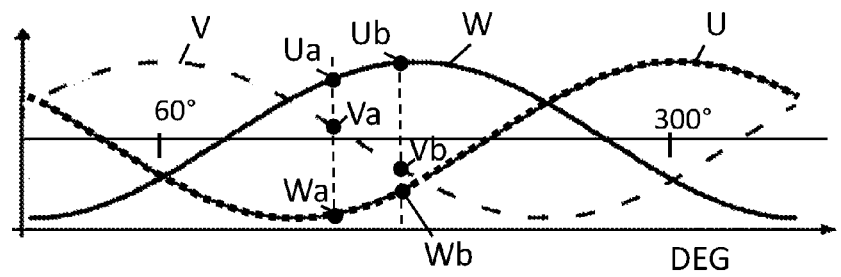
FIG. 1 shows an example of a set of three sinusoidal waveforms, which are 120° and 240° shifted with respect to each other. Two examples of "a set of three corresponding sinusoidal values", is indicated by black dots in FIG. 1.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

In the present invention, the terms "phase" and "winding" and "coil" and "phase winding" are used as synonyms.

Where in embodiments of the present invention reference is made to "phase current" of a motor, reference is made to the "total current" running through one phase winding.

Where in embodiments of the present invention reference is made to a "stator current" (Is) of a particular winding, reference is made to a component of the total current which is considered to be in phase with the "equivalent voltage signal" applied to that winding. The word "equivalent voltage" is used to indicate that the actual energizing signal may not be a smoothly varying voltage signal (as can be formed for example by a DAC), but can also be a PWM-signal having the same effect as the smoothly varying voltage signal at macro level. This aspect per se is well known in the art of motor drive circuits.

Where in embodiments of the present invention reference is made to a "rotor current" (Ir) of a particular winding, reference is made to a component of the total current which is caused by the back-electromotive force (EMF) induced in the coil, and is due to rotation of the rotor. The higher the angular speed, the higher the amplitude of the BEMF voltage, and the higher the amplitude of the rotor current.

The "total phase current" "It" is the sum of the stator current "Is" and the rotor current "Ir".

Where in embodiments of the present invention reference is made to "standstill", reference is made to a state of a motor whose rotor is not moving.

The term "startup of a motor" can be considered equivalent to "accelerating a motor from stand-still".

Where in the present invention reference is made to a "set of three sinusoidal signals", what is meant is that the amplitude of the three signals can be expressed as:

$$v1 = A \cdot \sin(\Phi),\ v2 = A \cdot \sin(\Phi - 120°),\ \text{and}\ v3 = A \cdot \sin(\Phi - 240°),$$

where A is a constant value, and $\Phi$ can be any angle in the range of 0° to 360°. In embodiments of the present invention, the amplitude may be defined by a voltage value, and the sine-value may be stored in a table (an example of which is shown in FIG. 11), where the angle $\Phi$ may be used as an index.

In a first aspect, the present invention relates to a method of starting up a motor, in particular of starting-up a motor from a stand-still position. The method can advantageously be applied to start and accelerate a motor to a given speed. The method of the present invention will be described in relation to an "ideal" three phase sinusoidal BLDC motor, but it also works for sinusoidal-like BLDC motors, as will be discussed in relation to FIG. 12 and FIG. 13.

Before discussing start-up behavior of the motor, the concept of "stator current" and "rotor current" as used herein, will be explained by referring to the behavior of a motor running at constant speed.

FIG. 1 shows three sinusoidal energizing signals U, V, W, typically used for driving a sinusoidal BLDC motor at constant speed. These energizing signals can for example be three voltage signals generated by three digital to analog converters, where the amplitude is varied as a function of time, or can be generated in any other way. For example, these energizing signals can be generated by using three PWM signals, where a duty cycle is varied as a function of time. The PWM signals may for example be buffered and/or low-pass filtered and optionally amplified, or they may be applied to half-bridges, or they may be applied to dual-H bridges, in manners known per se in the art. The use of PWM signals to drive BLDC-motors is well known in the art, and hence need not be further explained here.

Figure 2:
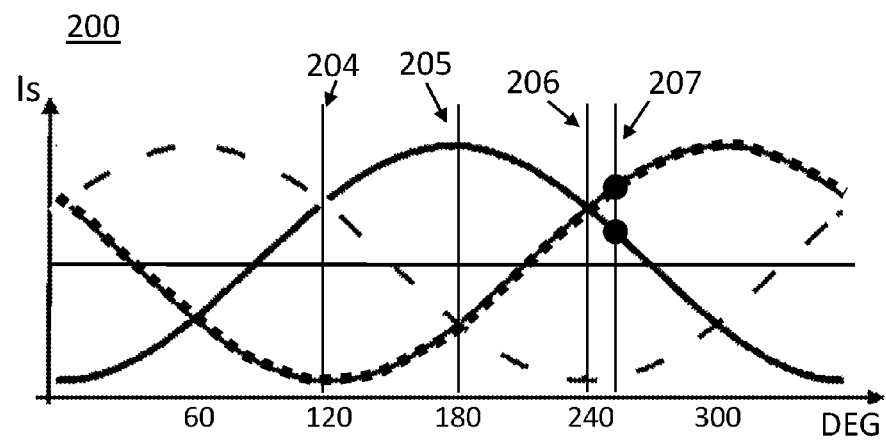
FIG. 2 is used to illustrate that the total current flowing through each of the windings of a BLDC-motor, when running at constant speed (i.e. in steady state), can be seen as a so called "stator current" substantially in phase with the applied voltage signals, and a so called "rotor current" substantially orthogonal to the applied voltage signals.
Figure 2:
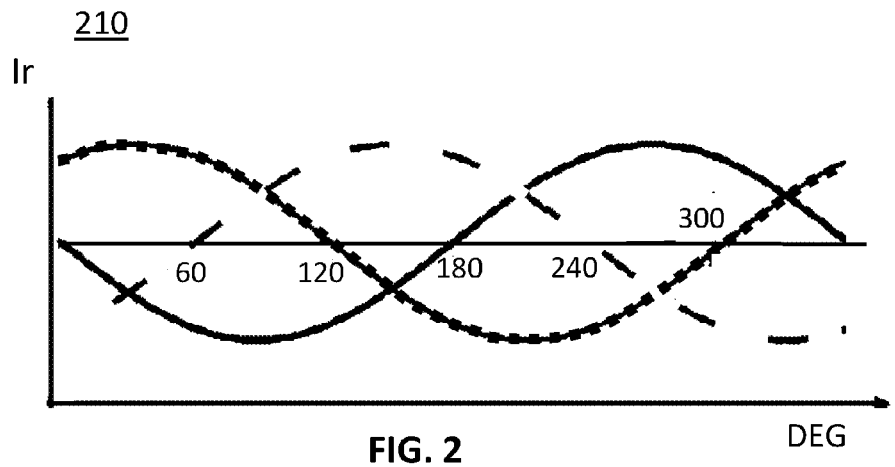

Applying the energizing signals shown in FIG. 1 to the phase windings of a sinusoidal BLDC motor running at constant speed (and in synchronism with the movements of the motor) results in generation of currents in the motor phases U, V, W, as shown in the upper diagram 200 of FIG. 2, showing the stator current "Is" in each of the phases U, V, W in degrees of electrical rotation.

Assuming that the BLDC motor is a so called "low-inductance" motor, the stator currents "Is" can be easily calculated as the applied voltage Va divided by the electrical resistance "Rp" of each phase winding. In this document, the stator currents and the applied voltages are considered in phase, according to the formula:

$$Is = Va/Rp \qquad [1]$$

The error introduced by these approximations is negligible if the inductive behaviour of the motor is neglected, hence only "Rp" needs to be taken into account. This approximation is valid if the rotor speed is relatively low, which is the case during startup of the motor, and/or if the motor has low inductance, which is usually the case for small BLDC motors as typically used in HVAC applications.

When a motor is running, the permanent magnet of the rotor tends to rotate in the direction of the magnetic field created by the stator windings. This rotor rotation generates a back electromotive force (BEMF), which induces a voltage in the coils. This induced voltage generates an additional current flow in the motor phases when the motor is connected to the driving elements (e.g. electronics, half bridges, flyback diodes, etc).

Figure 3:
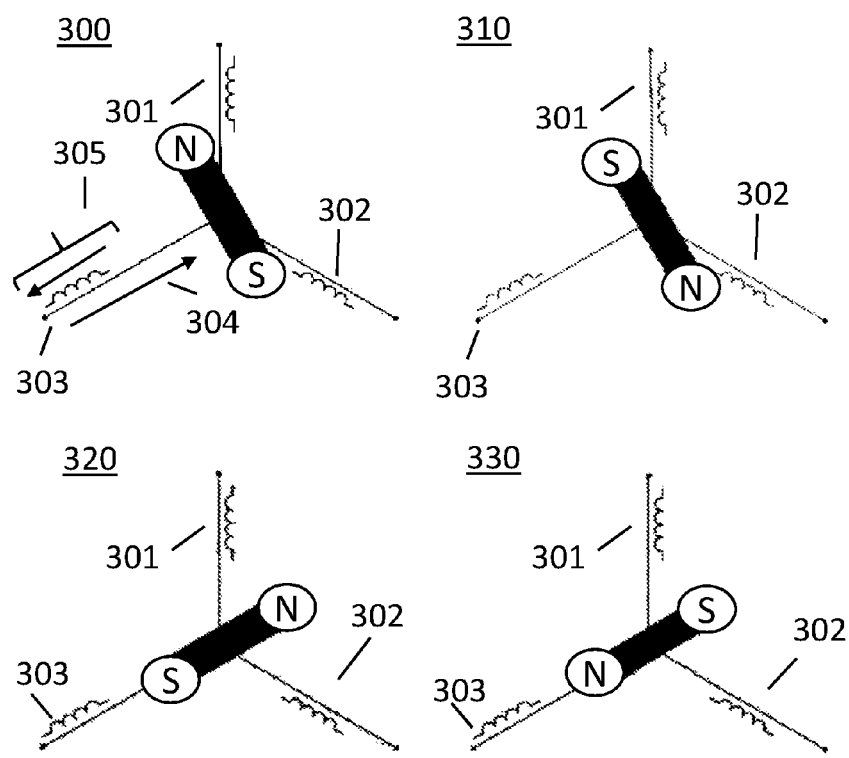
FIG. 3 shows several examples of how a rotor with a permanent magnet of a three-phase BLDC motor will align to the magnetic field created by the stator.
Figure 4:
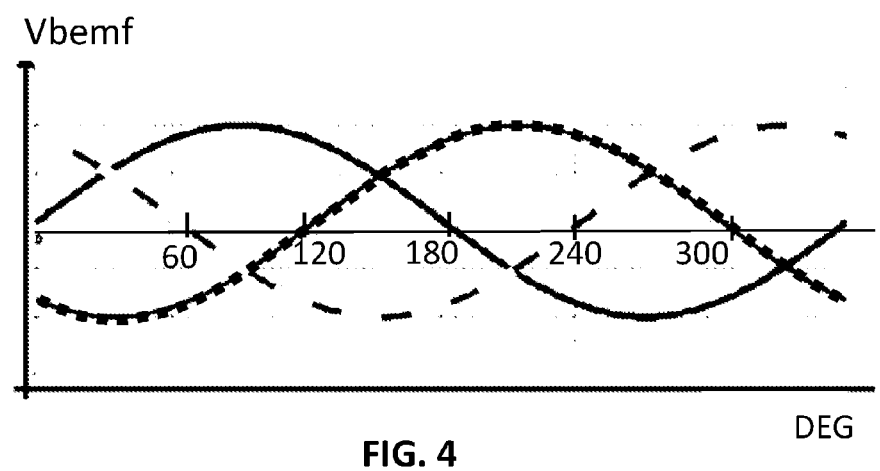
FIG. 4 shows an example of a BEMF voltage generated in each of the phase windings of an ideal sinusoidal motor (when running at constant speed).

Different positions of the rotor with respect to the phases U 301, V 302 and W 303 are shown in FIG. 3. The BEMF is the first derivative of the magnetic flux, hence the BEMF voltage of a phase reaches it extreme if the rotor magnet is directed orthogonal to this phase. This is the situation portrayed in FIG. 3, in the upper left scheme 300 and upper right scheme 310, in which the BEMF forms an extremum in the phase W. The zero crossings in phase W are represented in the lower left and lower right schemes 320, 330. As the BEMF voltages "Vb" reference point is opposite to the applied duty cycles reference point, the maximum BEMF causes a minimum in the generated rotor current "Ir" and vice-versa. The diagram of the BEMF voltage is shown in FIG. 4 for each phase U 401, V 402 and W 403 as a function of the degrees of one electrical rotation. The arrow towards the rotor 304 in the diagram 300 of FIG. 3 represents the rotor current, while the drop of potential generated by the BEMF has the direction opposite by the rotor current, as shown by the arrow in the brace 305. Thus, the (amplitude of the) rotor current "Ir" can be calculated from the voltage generated by the BEMF Vb and the phase resistance Rp, using the formula:

$$Ir = -Vb/Rp \qquad [2]$$

It is noted that this current only expresses the amplitude, while in reality, the rotor current is also dependent on the angular position (as illustrated in FIG. 2 below).

The generated current is sinusoidal with a phase shift of 90 degrees with respect to the current generated by the applied energizing signal Va (for example PWM voltage scheme) in the stator. The phase shifted signal normally has an amplitude lower than the applied energizing signal, so the sum of both would result in a sinusoidal current which is minimal when two sinusoidal currents have a phase shift of 180 degrees. This is the most efficient approach during the whole motor run. An efficient motor drive is present when, additionally, the rotor field vector lags 90 degrees behind the stator field vector, as it is shown by the phase lag between the stator current diagram 200 (upper diagram of FIG. 2) and the rotor current 210 (lower diagram of FIG. 2).

The diagram for the rotor current can hence be directly obtained from the BEMF voltage. FIG. 2 shows this rotor current in the lower diagram 210 for the case where sinusoidal energizing signals are applied, showing the rotor current for the phases U 211, V 212 and W 213 in respect of the degree of electrical rotation as a function of the degrees (DEG), for one electrical rotation.

The above is well known for a sinusoidal motor running at constant speed, but its relevance may not be immediately clear for the start-up of the motor, because the rotor is not moving yet, hence there is no BEMF, and thus there is no rotor current at startup.

Yet, one of the underlying ideas of the present invention is exactly based on monitoring the "rotor current" in two (or three) of the phase windings, which is counter-intuitive.

Another important aspect of the present invention is that the total current, stator current and rotor current are considered as scalars, and not as vectors, in contrast to for example the FOC algorithm. It is a major advantage of the present invention that no vector calculations are needed, as will become clear further.

Figure 7:
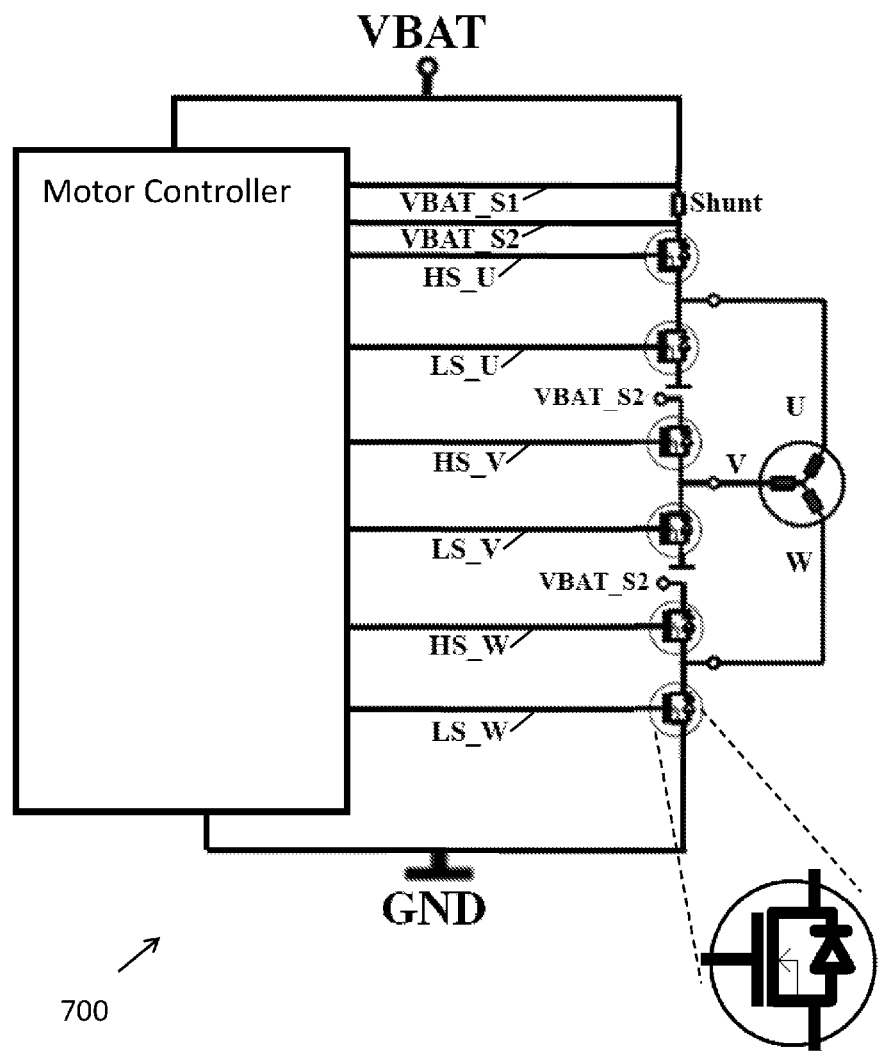
FIG. 7 shows an exemplary motor driver circuit according to embodiments of the present invention, having a single shunt resistor arranged in series with three high-side transistors.

The problem the inventors were confronted with, is to find a method to start-up a three phase sinusoidal BLDC motor, using a hardware setup such as the one shown in FIG. 7 to FIG. 10. What is shown is a motor controller, preferably a programmable micro-controller, but the invention is not limited thereto, and another controller, such as e.g. programmable logic or an ASIC may also be used. The hardware circuit further comprises three dual-H bridges having high-side transistors and low-side transistors and fly-back diodes, as is common in the art. Each of the transistors are driven by a respective PWM-signal, generated by the controller, in a manner such that the high-side transistor and low-side transistor are not simultaneously switched "ON". A common node between the high-side and low-side transistor of each dual-H bridge is connected to one of the phase windings for energizing said winding. The motor is a sinusoidal BLDC motor having a stator with three phase windings U, V, W and a rotor with a permanent magnet. The windings of the motor of FIG. 7 are connected in a Y-connection (also known as star-configuration), but the invention would also work for a Δ-connection (also known as delta-configuration).

The motor driver circuit further comprises current sensing means adapted for measuring a total phase current It_u, It_v, It_w in each of the phase windings U, V, W.

Current Sensing Means:

In the example shown, a single shunt resistor is used, connected in series with the parallel-connection of all the high-side transistors of the dual-H bridges. It is known in the art that the currents in each of the windings of a three-phase BLDC motor can be measured using a single shunt resistor. The interested reader not familiar with this concept may for example refer to "Derivation of motor line-current waveforms from the DC-link current of an inverter", Published in Electric Power Applications, IEE Proceedings B, Volume 136, Issue 4, pp 196-204, by Green, T. C.; Dept. of Electr. & Electron., Heriot-Watt Univ., Edinburgh, UK; Williams, B. W.)

But the present invention is not limited to embodiments with a single shunt resistor, and other configurations are also possible. For example, a single shunt resistor could also be present in series with the parallel-connection of all the low-side transistors (see FIG. 8). Or it is also possible to provide both resistors, one in series with the high-side transistors and one in series with the low-side transistors (not shown).

It is possible by using this single resistor to measure (at different moments in time) the currents flowing through each of the windings, provided that during the measurement, only one of the respective high-side transistors or respective low-side transistors are "ON".

Figure 9:
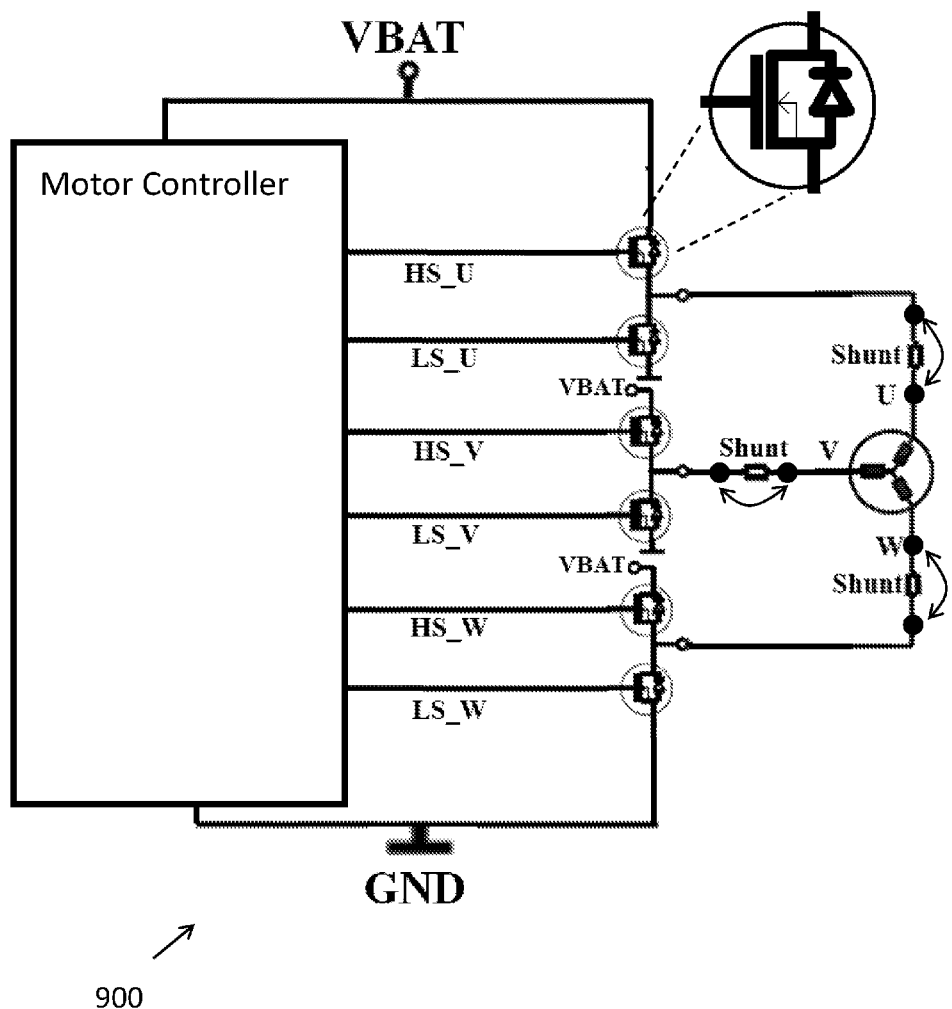
FIG. 9 shows an exemplary motor driver circuit according to embodiments of the present invention, having three shunt resistors, one in each winding.

Alternatively, it is also possible to provide one shunt resistor in series with each of the respective windings (see FIG. 9). This has the disadvantage of requiring more shunt resistors and more measurement means (for example three ADCs), but offers the advantage that the current can be measured at any time. Thus the moment of commutation could typically also be slightly faster when using three shunts.

But the invention is not limited to shunt resistors, and other current measurements means may also be used, for example based on Hall elements or any other current measurement means.

Algorithm:

The idea behind the present invention is based on the following insight. If three known voltages (or PWM signals) are applied to the windings, and if the windings can be considered to be mainly resistive (ignoring their inductance), three known stator currents would flow, which are proportional to the applied voltages (or duty cycle of the PWM signals). In order to simplify the description, we will only mention "voltages" from now on, but the invention is not limited thereto, and also works for PWM signals as energizing signals.

The inventors have noted that, when the value of each voltage of a set of sinusoidal voltages is compared (see FIG. 11), that the ratio of two of these voltages vary, but has a predefined value at each "angle". While these values per se are not novel, the table does in itself provide sufficient information of how this can be used for starting a motor.

The inventors experimented on start-up behavior of the three-phase BLDC motor. They applied a first set of sinusoidal signals (position A, wherein a set of three voltages are applied corresponding to a position ΦA, for example 30° in the table of FIG. 1, in which case U and W have the same value), and monitored the total current "It" in the windings U and W. The voltages were maintained, and the rotor was standing still.

Figure 5:
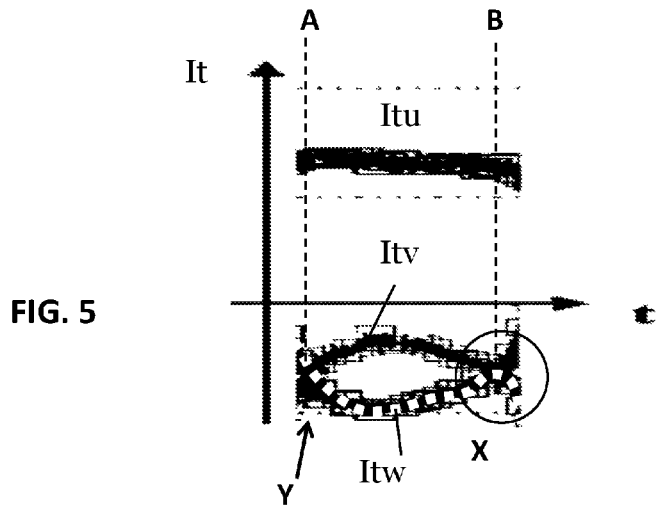
FIG. 5 shows an example of a single step of the method of the present invention, for a special case where two of the three sinusoidal energizing signals are identical.

They then applied a second set of sinusoidal signals (position B, corresponding to a position ΦB, for example 150° in the table of FIG. 11, in which position V and W have the same value), and monitored the total current "It" in the windings V and W (which is shown in FIG. 5), and the rotor started moving in order to align the rotor magnet to the stator magnetic field which was changed. Preferably the angular difference between the very first position B and initial position A is in the range from 100° to 170°, preferably in the range from 110° to 160°, for example about 120° or about 130° or about 140° or about 150°, but this only applies for the very first step.

Figure 6:
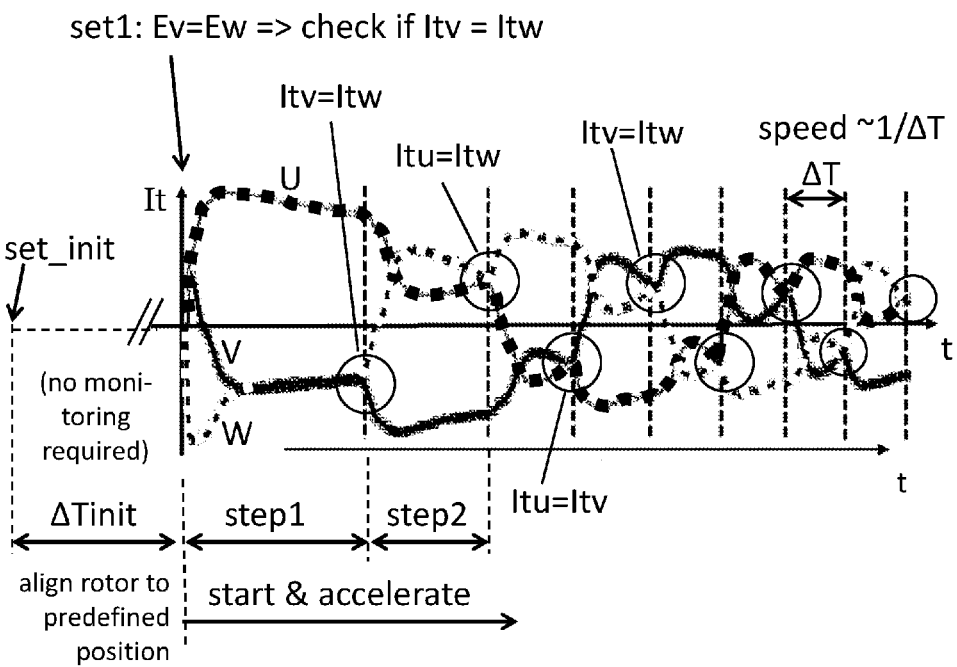
FIG. 6 shows an example of the total current flowing in the three windings of a motor, started using the method of the present invention, iterated over multiple steps.

The inventors further realized that, because in position B (in the example 150°), the voltage V and W have the same value, hence also the stator currents Iv and Iw are the same (see formula [1] above). Since the total current contains a stator current component and a rotor current component, and the stator component is the same for both windings, the differences between the two currents are thus related to the rotor current in each of these windings. The rotor current is a function of BEMF, which in turn is dependent on the motor speed (relatively slow at startup), but also on angular position. Since the angular speed for both windings is the same, the difference of the currents in FIG. 6 is thus an indication of the angular position of the rotor. Now, since they applied a set of energizing signals (position B=150° in this example) in which the voltage of V and W is the same, they realized that when the rotor passes the angular position at which the rotor magnetic field is in line with the stator magnetic field, is the moment at which also the rotor currents are the same. This moment in time at which both rotor currents (and thus also the total currents) cross each other, is indicated by the circle "X" (FIG. 5), and this is the ideal moment at which the next commutation should take place. This principle is the underlying idea of the present invention.

As can be seen in FIG. 5, showing raw ADC values taken by a 10 bit ADC, the total current Itu in winding U only slightly changed while the rotor moved over 60° (but that current is not relevant in this case), while the current Itv and Itw in windings V and W change noticeably. The algorithm will monitor, e.g. repeatedly measure the current through the windings V and W, and when they are substantially the same, it is decided that the rotor passes the angular position corresponding to the set B of energizing signals, and a next commutation is performed, by applying another set of sinusoidal energizing signals (not shown).

Since there are six angles at which two of the phase voltages are the same (in the Table of FIG. 11 that is: at 30°, 90°, 150°, 210°, 270° and 330°, hence, these six points can be used as commutation points, in the same way as illustrated in FIG. 5.

But the inventors went one step further, and they also realized that it is not really necessary that two of the voltages U, V, W are identical, and they realized that there are several angles at which the ratio of the voltages is a factor of +1 or −1, which is also extremely easy to test.

But the inventors went still further, and they also realized that there are several angles at which the ratio of the voltages is a factor of +2 or −2 or +1/2 or −1/2, and they realized that it is also relatively easy to realize an implementation that checks whether two currents satisfy this ratio. Indeed, referring back to FIG. 11, it can be seen that at an angle of 19°, the ratio of U/W is approximately 1/2, and at 30°, the ratio of UN is approximately −1/2, and at 41°, the ratio of U/W is approximately +2, etc.

In the embodiment using the hardware of FIG. 7, testing whether the currents U/W≈1/2 (meaning: is approximately equal to, within some tolerance margin) can for example be implemented as follows: the current Itu is measured using the shunt resistor and an ADC, the current Itw is measured using the same shunt resistor and an ADC, the value of Itw is shifted left by 1 bit (meaning: multiplied by 2), then the two values are subtracted from each other, and compared to a predefined tolerance margin.

This algorithm can be easily modified to test whether the ratio of two currents is approximately equal to any of the following ratios: +1, −1, +2, −2, +1/2, −1/2, +4, −4, +1/4, −1/4, etc, where the nominator is a power of 2, but the invention is not limited to these numbers, and also works for example for +3, −3, +1/3, −1/3, because multiplication of a value by 3 can be simply implemented by shifting left by 1 bit+adding the original value. Likewise, multiplying by 5 can be easily implemented by shift left 2 and add, etc.

In fact, the algorithm can be easily modified to test whether the ratio of two currents is approximately equal to about any rational number N/M, but of course the larger the values of N and M, the more complex the algorithm becomes.

The simplest implementation of course is when N=M=1. This is the most preferred embodiment.

The implementation for ratio N/M, where N=1 and M=2, 4, 8, 16 or M=1 and N=2, 4, 8, 16 is only slightly more complicated (requiring only an additional shift operation). This is the second most preferred embodiment.

But also the implementation for ratio N/M, where N=1 and M=3, 5, 9 or M=1 and N=3, 5, 9 is still quite manageable, requiring only an additional shift operation and only one additional add operation. This is also a preferred embodiment.

The method proposed by the present invention goes as follows.

It is assumed that initially the rotor is standing still.

If the rotor is standing still in an unknown position (which is usually the case), then, in a first step (a), the rotor is moved to a known predetermined position, preferably by applying a set of sinusoidal energizing signals (for example the set shown in FIG. 1, but any other set of sinusoidal energizing signals would also work). Alternatively, the current position of the rotor is determined by using other mechanisms, such as for example by using pulses or detecting the position of the rotor using an optical position sensor, or magnetic position sensor, or any other kind of sensor. While it would be possible to orient the rotor in a predetermined position by energizing only a single winding, or only two windings, or by applying a random set of voltages (not a sinusoidal set as defined above), this would create a larger transient behavior in the next step, which would create more acoustic noise.

In a next step (b), a set (or another set) of energizing signals is applied to the stator for generating a magnetic field in a direction different from the initial rotor direction, in order to move the rotor to another position (as was illustrated in FIG. 5, when applying set B).

The energizing signals cause stator currents to flow in the windings U, V, W. These currents generate a magnetic field oriented in a direction different from the initial direction used in step (a). The set of signals is maintained, allowing the rotor to move to an angular position different from the initial angular position. The rotor movement induces BEMF voltages in the windings, which in turn causes rotor currents to flow in the windings (assuming there is a conductive path).

According to the invention, in a step (c) at least two of the total currents are being monitored, and checked whether they satisfy a predetermined relationship. The relationship includes testing whether the value of the total currents of two selected windings are substantially equal (i.e. equal within a predefined tolerance margin) to a predefined value, where the value depends on the particular energizing signals being applied (as shown in FIG. 11). However, as also seen in FIG. 5, the values already crossed shortly after the set "A" of energizing signals were applied. This is however not the position of the next commutation. Hence, another criterium needs to be used to excluded this "position Y" as an invalid position. Such other criterium may for example be based on the "expected time" required for the rotor to move from the previous angular position to the next angular position, taking into account the inertia of the rotor, or based on experiments. When the controller has a timer, this is simple to implement. But other criteria may also be used, for example by looking whether the respective signals Itv, Itw are increasing or decreasing. In the example of FIG. 5, the point Y is invalid, because at the moment of "signal crossing", the signal Itv was increasing, whereas in position X, the signal Itv was decreasing. Whether the signal should increase or decrease depends on the angular position chosen.

When the motor has reached the point "X", the steps described above may be repeated, using a second or further set of sinusoidal signals.

In the method described above, the test is whether the two current signals are substantially identical. In a more general case, it is tested whether the ratio of the currents corresponds to a predefined ratio. The latter may depend on the energizing signals being applied.

In some embodiments, rather than applying only a single static set of sinusoidal voltages in the very first execution of step (b), it is also possible to apply one or more sets of intermediate sinusoidal energizing signals, and maintaining them for a predefined (short) time. This so called "fast stepping" can be applied in an open-loop manner (i.e. without monitoring the currents in the windings. This may help to further reduce the acoustic noise.

FIG. 6 shows the total current in each of the windings, when the above method is performed in steps of 60°, in a manner similar to FIG. 5. Using the table of FIG. 11, this would mean that only a set of only six energizing signals are used, namely energizing signals corresponding to 30°, 90°, 150°, 210°, 270° and 330°. As can be seen, for each additional step, the time between two commutations decreases, and the motor accelerates. Only the first time, directly after the initialization set, may be different. Although the eye pattern in the very first step is not well visible in FIG. 6, tests with a 10-bit ADC showed that there was indeed a difference (albeit quite small) in the order of the value 5 to 20 "before" the ideal commutation point, but this is sufficient. Moreover, even if the commutation of the first step would be executed slightly earlier or slightly later than the "ideal moment" that is not critical, because the motor would continue to rotate (due to inertia), and as the motor gains more speed with each commutation, the size of the eye pattern grows, making it easier to find the "crossing".

Preferred embodiments of the present invention use a limited set of energizing signals containing at most 50 different sets of energizing signals, and thus also a limited set of ratio-values to be checked.

Example 1

In one embodiment, a set of energizing signals is selected for which at least two of the windings have a ratio equal to +1. This set of energizing signals corresponds to the set of (30°, 90°, 150°, 210°, 270°, 330°) in the table of FIG. 11 (not all values are shown in the table, but the skilled person can easily extend the table).

Example 2

In another embodiment, a set of energizing signals is selected for which at least two of the windings have a ratio equal to +1 or −1. This set of energizing signals corresponds to the set (0°, 30°, 60°, 90°, 120°, 150°, 180°, 210°, 240°, 270°, 300°), 330° of FIG. 11. It is noted that in some of these "positions" another combination of the windings may have a ratio equal to +2, −2, +1/2 or −1/2, which may also be used of course, optionally in combination with the first test. It is noted that for example the ratio of U/W is not mentioned in FIG. 11 for 60°, because this value would be infinite, but the ratio of W/U, is 0, and can be used.

Example 3

In another particular embodiment, a limited set of energizing signals are selected to correspond with the group of the following angular positions: (0°, 11°, 14°, 19°, 30°, 41°, 46°, 49°, 60°, 71°, 74°, 79°, 90°, 101°, 106°, 109°, 120°, 131°, 134°, 139°, 150°, 161°, 166°, 169°, 180°, 191°, 194°, 199°, 210°, 221°, 226°, 229°, 240°, 251°, 254°, 259°, 270°, 281°, 286°, 289°, 300°, 311°, 314°, 319°, 330°, 341°, 346°, 349°), or a subset thereof. These angular positions are chosen such that at least one of the ratios U/N, U/W or V/W is equal to: +4, −4, +3, −3, +2, −2, +1, −1, +1/2, −1/2, +1/3, −1/3, +1/4, −1/4, which as described above, can readily be implemented using a simple microcontroller, or programmable logic, without requiring a multiplier or divider.

Example 4

In another particular embodiment, the limited set of energizing signals does not contain angular positions for which the ratio is +1 or −1. This set of energizing signals may be the following set, or any subset thereof: (11°, 14°, 19°, 41°, 46°, 49°, 71°, 74°, 79°, 101°, 106°, 109°, 131°, 134°, 139°, 161°, 166°, 169°, 191°, 194°, 199°, 221°, 226°, 229°, 251°, 254°, 259°, 281°, 286°, 289°, 311°, 314°, 319°, 341°, 346°, 349°). These angular positions are chosen such that at least one of the ratios U/N, U/W or V/W is equal to: +4, −4, +3, −3, +2, −2, +1/2, −1/2, +1/3, −1/3, +1/4, −1/4, which as described above, can readily be implemented using a simple microcontroller, or programmable logic, without requiring a multiplier or divider.

Embodiments of the present invention may further include a test of whether the motor is stalled (meaning: does not rotate), for example if the crossing X of FIG. 5 does not occur within a given time-window. This can easily be detected by using a so called time-out. Depending on the application, if this happens, the motor could retry to turn the motor in the opposite direction to see if it is blocked. Or the motor controller may give an alarm signal, and stop providing power to the motor, in order to avoid damaging the motor.

Further methods of the present invention may comprise starting and accelerating a three-phase BLDC motor to a predefined angular speed. Such method may comprise starting the motor as described above, and repeating the steps (b) and (c) a predetermined number of times, or until a predefined angular speed is obtained. The number may be any suitable number, for example at least once, or at least 10 times, or at least 100 times. The predefined speed may be any angular speed, for example at least 10 RPM, or at least 100 RPM, or at least 1000 RPM, depending on the type of motor and requirements. The number of iterations may also depend on the type of motor, load, predefined speed, application, etc.

The invention is also related to a method of driving a three-phase BLDC motor according to a predefined speed profile. Such method may comprise starting and accelerating the motor as explained above until a predefined angular speed is obtained, and may then switch to a second algorithm for controlling the speed of the motor. Any known method may be used as second algorithm.

Motor Drive Circuit:

FIG. 7 to FIG. 10 show several examples of a motor drive circuit that can be used to perform the method described above. The motor drive circuit typically comprises: a motor controller, current sensing means, and a drive stage.

The motor driver is part of a motor system comprising the motor drive circuit and a three-phase BLDC motor.

The motor controller can for example be a programmable microcontroller or programmable logic or an integrated circuit or the like.

The current sensing means may comprise only a single current sensor in the high-side or in the low side of the bridge. In some embodiments of the present invention, it may comprise a current sensor in both the high side and in the low side of the bridge. In some embodiments of the present invention, the at least one current sensor comprises only one, or only two or three shunt resistors. For example, it may comprise at least one shunt resistor in each of the phases, for measuring the current in each of the phase windings. The present invention is not limited to shunt sensors, and it may comprise other type of current sensors, e.g. based on Hall elements.

The drive stage typically comprises three so called half-bridges, each half-bridge comprising two transistors, each having a fly-back diode. The working of such a drive stage is well known in the art, and need not be further described here.

In a preferred embodiment, the controller has:
six outputs, each providing a PWM signal to one of the transistors;
two or more inputs for reading a/the voltage(s) over the shunt resistor(s);
a number of PWM blocks (e.g. three or six, depending on the implementation) for generating the six PWM signals;
one or more analog-to-digital convertor(s) (ADC) for digitizing the voltage over the shunt resistor(s), each having a resolution of at least 8 bits, preferably at least 10 bits;
a calculation unit capable of performing simple arithmetic operations (such as shift left, shift right, compare, add, subtract, take absolute value, but a divide instruction is not required. Even a multiply-instruction is not absolutely required.

Tests have shown that good results can be achieved with a 10 bit ADC, and that no additional filtering is required for measuring the current value through the shunt (neither digital or analog), which is a major advantage, in that no extra components, nor extra board space, nor extra processing power is required. Reference is made to FIG. 5 in this respect, showing the ADC values as they were directly obtained from the ADC. Of course, stabilization of the voltage supply and good decoupling of the power and ground of the motor controller is typically required for obtaining good ADC values, but this is normal practice.

The motor controller and the drive stage may be integrated in a single hybrid chip, or may be separate devices, e.g. a digital motor controller and an analog driver part.

The controller may be a microcontroller comprising for example a programmable micro-processor and/or one or more lookup tables. The program may be stored in a non-volatile memory (such as flash or ROM), embedded in the microcontroller or external thereto. The program would contain instructions to perform the method as described above, and may use one or more look-up tables similar to that shown in FIG. 11. Alternatively, or in combination, some or all of these values may be hardcoded in the program or in the hardware implementation.

The motor control circuit may be implemented using a Printed Circuit Board (PCB), and it may further comprise current measurement circuitry, e.g. voltage stabilizers, voltage rectifier, one or more voltage dividers, etc.

FIG. 7 shows an exemplary motor driver circuit with a single shunt resistor arranged in series with the three high-side transistors.

Figure 8:
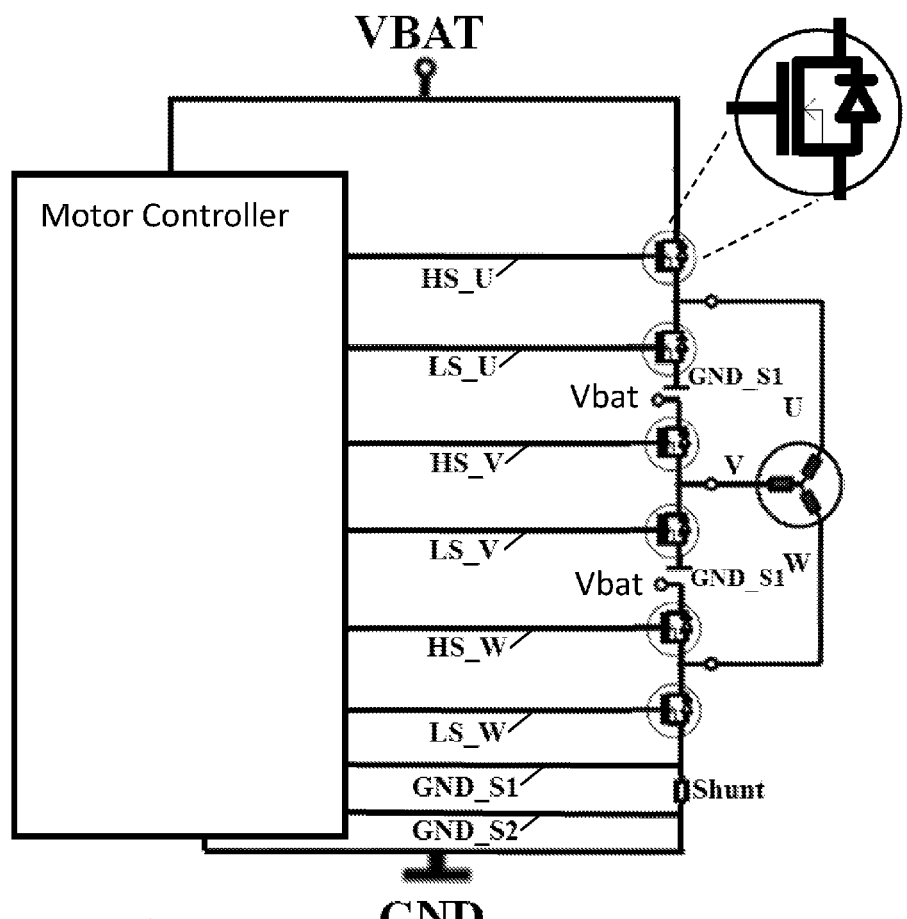
FIG. 8 shows an exemplary motor driver circuit according to embodiments of the present invention, having a single shunt resistor arranged in series with three low-side transistors.

FIG. 8 shows an exemplary motor driver circuit with a single shunt resistor arranged in series with three low-side transistors.

FIG. 9 shows an exemplary motor driver circuit, having three shunt resistors, one in series with each phase. Each of these resistors is configured to measure the current in a single phase winding. Using three shunt resistors offers the advantage that the three currents can be measured all the time, and can be measure simultaneously. Although not explicitly shown in FIG. 9, the motor-controller also needs three ADCs or an ADC with input multiplexing functionality or multiplexing circuitry in this case, thus requiring four additional inputs as compared to the motor controller of FIG. 7 and FIG. 11. Despite the additional cost, an advantage of this circuit could be that there is more design-freedom for generating the PWM signals, and more design freedom regarding the specific time at which the current in the windings is to be measured. (as explained in the IEE publication, mentioned above).

Figure 10:
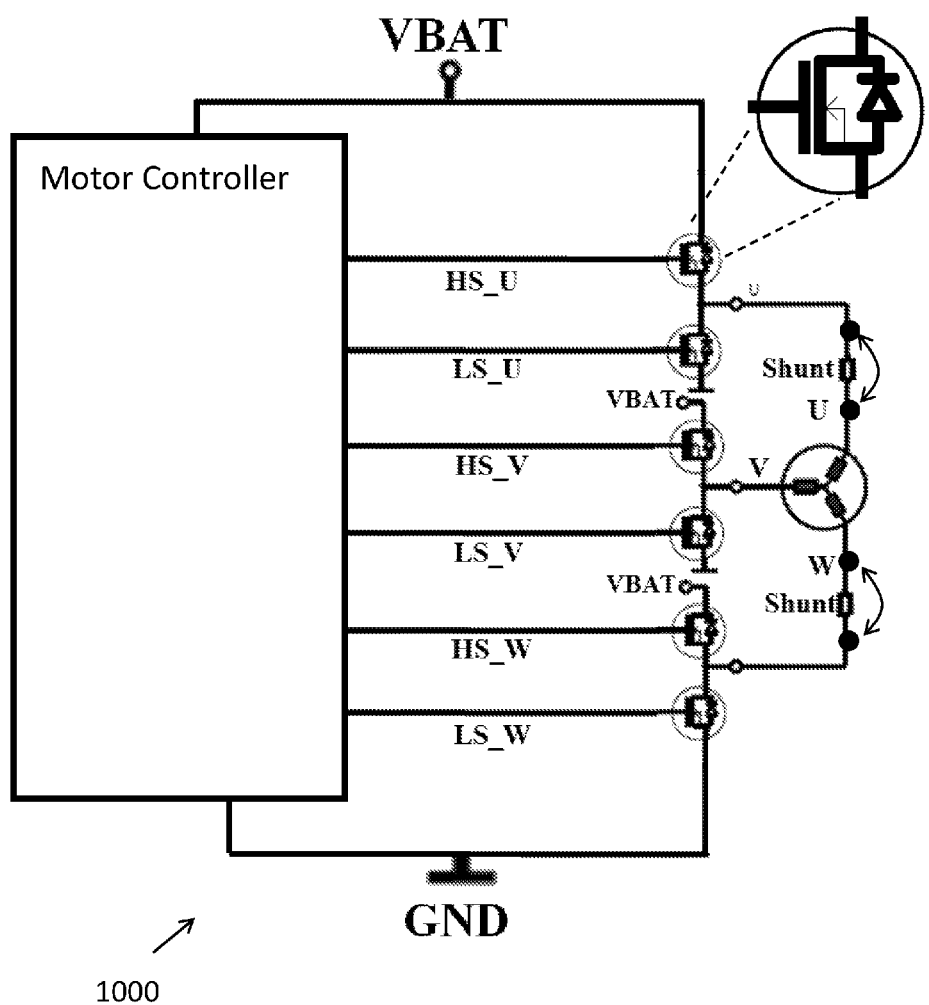
FIG. 10 shows an exemplary motor driver circuit according to embodiments of the present invention, having only two shunt resistors.

FIG. 10 shows an exemplary motor driver circuit having only two shunt resistors, arranged in two selected windings. Although not shown, in this case the motor controller would need two ADCs or one ADC with input multiplexing functionality or multiplexing circuitry. From the description above, and looking to FIG. 11, it should be clear that it is very well possible to control the motor by monitoring only two selected windings, for example only U and V, thus not W. This does limit the set of energizing signals however where the above mentioned ratio can be detected. For example, in case the current in phase W is not mentioned, the angle of 11° could not be used. The third current (in this case W) can be simply calculated based on the currents in Phase U and V using Kirchhoffs current law, enabling the usage of the full set of energizing signals as listed in FIG. 11.

FIG. 11 is a table with values indicating an angular position in degrees and radians (column 1-2), approximate values of samples of sinusoidal sine functions taken at those angular positions (column 3-5), and ratios of two of these values (column 6-11). Some values are omitted (where the number would become too large). In practical applications, such values can easily be avoided in software.

Some "interesting" angles and ratios are indicated by a black box, for explaining the principles of the present invention. Only values for the angles in the range of 0° to 90° are shown, but embodiments of the present invention could store the complete table, with angles ranging from 0° to 360°. However, depending on the specific embodiment, only a subset of these values will actually be used, for example, in case of EXAMPLE_1 described above, only the values for six sets (out of the 360 sets of values suggested by Table 1, in increments of 1°) would need to be stored, and in case of EXAMPLE_2 described above, only twelve sets would be sufficient.

It was found that, when using the method of the present invention for starting a motor, the acoustical noise level could be reduced by at least 30 dB in a frequency band from 0 to 20 kHz during acceleration from standstill, as compared to an existing open-loop software starting the same motor to a speed of about 500 RPM.

The present invention is mainly aimed at three-phase sinusoidal BLDC motor for HVAC applications, where typically motors of 100 Watt to 1000 Watt are used, but the method and circuits described herein can also be used for other applications, for example to drive three-phase BLDC motors having a power rate in the range from 1.0 Watt to 100 Watt, as may be used in fan-applications, where acoustic noise is a major concern. But the invention can also be used to start motors having a power rating in the range from 1000 Watt to 5000 Watt.

Figure 12:
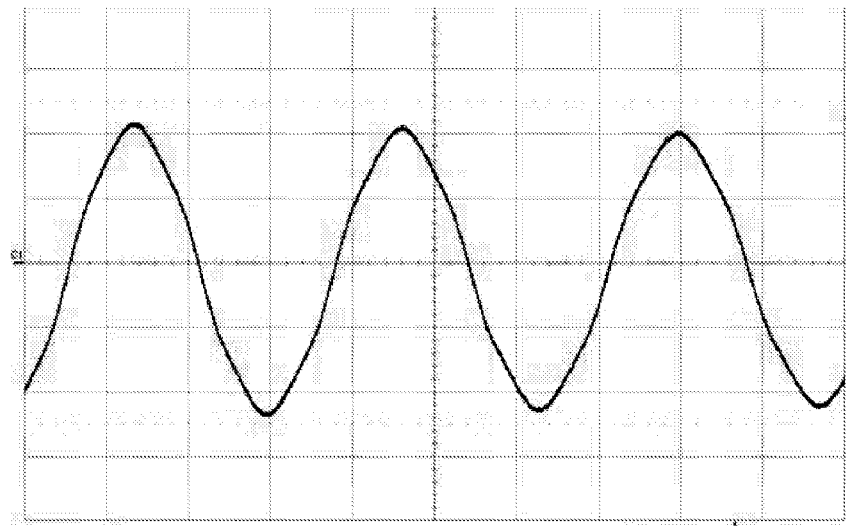
FIG. 12 is a measurement of the BEMF of a first exemplary three-phase (alleged "sinusoidal" BLDC motor), turning at constant speed, to illustrate that the invention also works if the windings provide non-ideal waveforms, but resemble sinusoidal functions.
Figure 13:
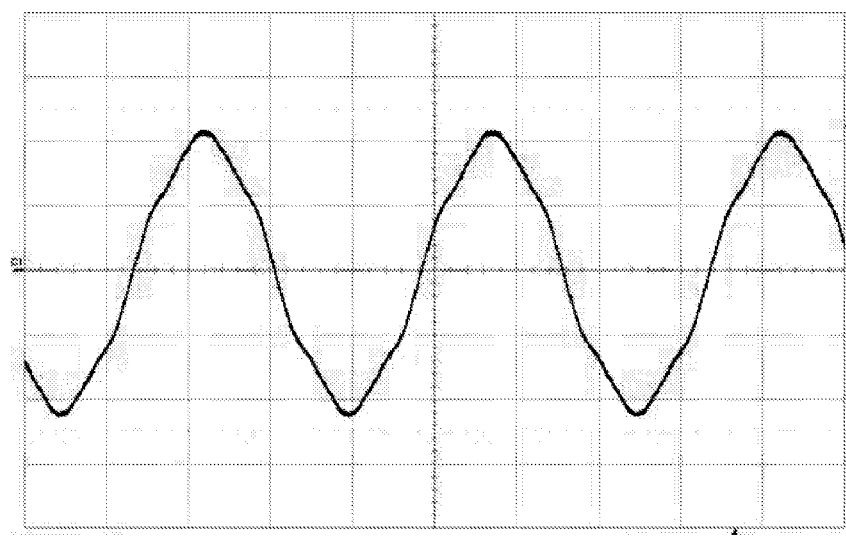
FIG. 13 is another example of the BEMF of a non-ideal three-phase BLDC motor.

Practical Motors:

FIG. 12 is a measurement of the BEMF of one of the windings of a first three-phase alleged "sinusoidal" BLDC motor, turning at constant speed, as a first example to illustrate that the waveform of a practical motor need not be an "ideal" or a "pure" sinusoidal function, but it suffices for the present invention that the waveform resembles a "sinusoidal" or "triangular" function. FIG. 13 shows a measurement of another three-phase BLDC motor, where the BEMF waveform seems to resemble more a triangular waveform than a pure sinusoidal waveform.

Tests have shown that the method and motor driver according to the present invention work also very well for these kinds of motors. It is contemplated that possibly a further improvement in acoustical noise reduction may be achieved if the values of Table 11 would be adjusted to reflect the "real value" of the BEMF voltage at each angular position of the specific motor being used, but that is not absolutely required for the invention to work.

As it appears difficult to exactly define when a motor is a "sinusoidal motor", and when it is not, it can be stated that the present invention works for motors which have a BEMF-waveform (when being driven at constant speed by an external force) which waveform is monotonically decreasing and increasing between maximum and minimum values, which maxima and minima are interleaved and periodically spaced apart by about 60 electrical degrees. For example, a motor having a waveform which is "flat" over for example more than 20 electrical degrees, or which has a significant "local peak", may not work.

The invention claimed is:

1. A method of starting a three-phase BLDC motor comprising a stator with three phase windings and a rotor with a permanent magnet, and a current sensor adapted to measure a phase current in at least two of the three phase windings, the method comprising:
   a) determining an initial angular position of the permanent magnet;
   b) applying a first set of sinusoidal energizing signals to the three phase windings for causing first stator currents to flow in the three phase windings thereby generating a first magnetic field oriented in a first direction different from an initial direction of the magnetic field of the permanent magnet, the first set of energizing signals corresponding to a set of values of three sinusoidal waveforms shifted apart by 120° and 240° sampled at a first angle;
   and maintaining the first set of energizing signals for allowing the rotor to move to a first angular position different from the initial angular position, the rotor movement causing BEMF voltages to be induced and corresponding rotor currents to flow in the three phase windings;
   c) while maintaining the first set of sinusoidal energizing signals, monitoring two of the three-phase BLDC motor phase currents flowing through two of the three phase windings using the current sensor, and determining whether a predefined condition is satisfied, the predefined condition comprising testing whether a ratio of said two phase current values is substantially equal to a predefined value,
   and if the outcome of the test is true, to apply a commutation by repeating steps b) and c) at least once, but instead of applying the first set of sinusoidal energizing signals, applying a second respectively further set of sinusoidal energizing signals; different from a set of sinusoidal energizing signals applied in a previous iteration to thereby move the rotor to a second respectively further angular position;
wherein the first, second and any further angles are selected from a limited group of discrete angular positions.

2. A method according to claim 1, wherein step c) further comprises one or more of the following:
   (i) monitoring the phase currents during a predefined time window;
   (ii) determining whether the monitored phase currents are increasing or decreasing with time;
   (iii) taking into account that one of the monitored phase currents is larger than the other monitored phase current.

3. A method according to claim 1, wherein:
   the limited group of discrete angular positions is the group consisting of the angles for which at least two of the energizing signals are equal in sign and magnitude, causing corresponding stator currents in said three phase windings to be also equal in sign and magnitude;
   and wherein step c) comprises monitoring the phase currents in said two phase windings, and testing whether the value of these two phase currents are equal in sign and magnitude.

4. A method according to claim 1, and one of the following:
   A) wherein the limited group of discrete angular positions is the group consisting of the angles for which at least two of the energizing signals have a ratio in the group consisting of (+1, −1), causing corresponding stator currents in said stator windings to have the same ratio; and wherein step c) comprises monitoring the phase currents in said two phase windings, and testing whether the value of these two phase currents have the same ratio; or
   B) wherein the limited group of discrete angular positions is the group comprising or consisting of the angles for which at least two of the stator energizing signals have a ratio in the group consisting of (+2, −2, +1, −1, +1/2, −1/2), causing corresponding stator currents in said stator windings to have the same ratio; and wherein step c) comprises monitoring the phase currents in said two phase windings, and testing whether the value of these two phase currents have the same ratio; or
   C) wherein the limited group of discrete angular positions is the group consisting of the angles for which at least two of the stator energizing signals have a ratio in the group consisting of (+4, −4, +3, −3, +2, −2, +1, −1, +1/2, −1/2, +1/3, −1/3, +1/4, −1/4), or a subset of this group, causing corresponding stator currents in said stator windings to have the same ratio; and wherein step c) comprises monitoring the phase currents in said two phase windings, and testing whether the value of these two phase currents have the same ratio; or
   D) wherein the limited group of discrete angular positions is the group consisting of the angles for which at least two of the stator energizing signals have a ratio in the group consisting of (+4, −4, +3, −3, +2, −2, +1/2, −1/2, +1/3, −1/3, +1/4, −1/4), but none of the signals have a ratio of +1 or −1, or a subset of this group, causing corresponding stator currents in said stator windings to have the same ratio; and wherein step c) comprises monitoring phase currents in said two phase windings, and testing whether the value of these two phase currents have the same ratio; or
   E) wherein the limited group of discrete angular positions is the group consisting of the angles for which at least two of the stator energizing signals have a ratio in the group consisting of (+4, −4, +3, −3, +2, −2, −1, +1/2, −1/2, +1/3, −1/3, +1/4, −1/4), but none of the signals have a ratio of +1, or a subset of this group, causing corresponding stator currents in said stator windings to have the same ratio; and wherein step c) comprises monitoring the phase currents in said two phase windings, and testing whether the value of these two phase currents have the same ratio.

5. A method according to claim 1, wherein step a) comprises:
   applying an initial set of energizing signals to the three phase windings for causing an initial set of stator currents to flow in the three phase windings, thereby generating a magnetic field oriented in a predefined initial direction, the initial set of energizing signals corresponding to a set of values of three sinusoidal waveforms shifted apart by 120° and 240° sampled at an initial angle; and
   maintaining the initial set of energizing signals for at least a predefined time period.

6. A method according to claim 1, wherein step a) comprises:
   determining an angular position of the permanent magnet based on the application of a series of pulses to the three phase windings.

7. A method according to claim 1, wherein step b) further comprises, before applying the first set of sinusoidal energizing signals:
   applying at least one intermediate set of sinusoidal energizing signals to the three phase windings, corresponding to a set of values of three sinusoidal waveforms shifted apart by 120° and 240° sampled at an intermediate angle between an initial angle and the first angle, and maintaining the intermediate set of energizing signals for a predefined time.

8. A method according to claim 1, wherein step c) further comprises using a time-out window when monitoring whether the predefined condition is satisfied, and if the predefined condition is not satisfied within the time-out window, to decide that the three-phase BLDC motor has stalled, and to stop energizing the three-phase BLDC motor.

9. A method of driving a three-phase BLDC motor according to a predefined speed profile, the three-phase BLDC motor comprising a stator with three phase windings and a rotor with a permanent magnet, and a current sensor adapted to measure a phase current in each of the three phase windings, the method comprising:
   starting the three-phase BLDC motor using the method according to claim 1 and accelerating the three-phase BLDC motor, wherein the method further comprises a step d) of measuring an angular speed of the rotor; and if the measured angular speed is higher than a predetermined value, to use a predetermined algorithm to drive the three-phase BLDC motor according to the predefined speed profile.

10. A method according to claim 9 wherein the predetermined algorithm is based on measuring a BEMF at zero crossings of the current.

11. A motor driver for performing the method according to claim 1, the motor driver comprising:
   an energizer configured to energize the three phase windings of the three-phase BLDC motor;
   a current sensor configured to measure a current in each of the three phase windings;

a controller having six outputs for energizing the three phase windings, and having at least two inputs connected to the current sensor;

the controller being adapted for performing the method according to claim 1.

12. A motor driver according to claim 11, wherein the energizer comprises three bridge circuits each containing a high-side transistor and a low-side transistor connected in series, and wherein the controller further comprises:
at least one analog-to-digital converter for measuring and digitizing at least one signal coming from the current sensor;
a waveform generator configured to generate six PWM waveforms to the three bridge circuits.

13. The motor driver according to claim 11, wherein the current sensor comprises two Hall elements or three Hall elements or two shunt resistors or three shunt resistors, each being arranged for measuring a current in a single phase winding, and being connected to the controller for allowing readout thereof.

14. The motor driver according to claim 11, and one of the following:
A) wherein the current sensor consists of a single shunt resistor arranged in series with the high-side transistors of the bridge circuits, the shunt resistor having two ends, each end being connected to an input of the controller; or
B) wherein the current sensor consists of a single shunt resistor arranged in series with the low-side transistors of the bridge circuits, the shunt resistor having two ends, each end being connected to an input of the controller; or
C) wherein the current sensor consists of two shunt resistors, an upper shunt resistor arranged in series with the high-side transistors of the bridge circuits, and a lower shunt resistor arranged in series with the low-side transistors of the bridge circuits.

15. The motor driver according to claim 11, further comprising a timer;
and wherein the motor driver is further adapted for calculating an angular speed of the three-phase BLDC motor using said timer.

16. A method according to claim 1, wherein the limited group of discrete angular positions is the group consisting of the angles for which at least two of the stator energizing signals have a ratio in the group consisting of (+1, −1), causing corresponding stator currents in said stator windings to have the same ratio; and wherein step c) comprises monitoring phase currents in said two phase windings, and testing whether the value of these two phase currents have the same ratio.

17. A method according to claim 1, wherein the limited group of discrete angular positions is the group comprising or consisting of the angles for which at least two of the stator energizing signals have a ratio in the group consisting of (+2, −2, +1, −1, +1/2, −1/2), causing corresponding stator currents in said stator windings to have the same ratio; and wherein step c) comprises monitoring phase currents in said two phase windings, and testing whether the value of these two phase currents have the same ratio.

18. A method according to claim 1, wherein the limited group of discrete angular positions is the group consisting of the angles for which at least two of the stator energizing signals have a ratio in the group consisting of (+4, −4, +3, −3, +2, −2, +1, −1, +1/2, −1/2, +1/3, −1/3, +1/4, −1/4), or a subset of this group, causing corresponding stator currents in said stator windings to have the same ratio; and wherein step c) comprises monitoring phase currents in said two phase windings, and testing whether the value of these two phase currents have the same ratio.

19. A method according to claim 1, wherein the limited group of discrete angular positions is the group consisting of the angles for which at least two of the stator energizing signals have a ratio in the group consisting of (+4, −4, +3, −3, +2, −2, +1/2, −1/2, +1/3, −1/3, +1/4, −1/4), but none of the signals have a ratio of +1 or −1, or a subset of this group, causing the corresponding stator currents in said stator windings to have the same ratio; and wherein step c) comprises monitoring phase currents in said two phase windings, and testing whether the value of these two phase currents have the same ratio.

20. A method according to claim 1, wherein the limited group of discrete angular positions is the group consisting of the angles for which at least two of the stator energizing signals have a ratio in the group consisting of (+4, −4, +3, −3, +2, −2, −1, +1/2, −1/2, +1/3, −1/3, +1/4, −1/4), but none of the signals have a ratio of +1, or a subset of this group, causing corresponding stator currents in said stator windings to have the same ratio; and wherein step c) comprises monitoring phase currents in said two phase windings, and testing whether the value of these two phase currents have the same ratio.

* * * * *